United States Patent
Matsukawa et al.

(10) Patent No.: US 8,416,581 B2
(45) Date of Patent: Apr. 9, 2013

(54) ELECTRONIC APPARATUS AND ELECTRONIC APPARATUS WIRING HARNESS HAVING A FLAT U-SHAPE

(75) Inventors: Takashi Matsukawa, Sakura (JP); Yuuki Tanaka, Sakura (JP); Masako Ito, Sakura (JP); Tomoyuki Shinohara, Tokyo (JP); Shigeru Ashida, Tokyo (JP); Yasushi Nakagawa, Klongluang District (TH)

(73) Assignee: Fujikura Ltd., Tokyo (JP)

( * ) Notice: Subject to any disclaimer, the term of this patent is extended or adjusted under 35 U.S.C. 154(b) by 322 days.

(21) Appl. No.: 12/776,104

(22) Filed: May 7, 2010

(65) Prior Publication Data

US 2010/0214761 A1    Aug. 26, 2010

Related U.S. Application Data

(63) Continuation of application No. PCT/JP2008/070614, filed on Nov. 12, 2008.

(30) Foreign Application Priority Data

Nov. 12, 2007  (JP) ................................. 2007-293195
Apr. 2, 2008   (JP) ................................. 2008-096233

(51) Int. Cl.
    *H02B 1/20*        (2006.01)
(52) U.S. Cl. ....................................................... 361/826
(58) Field of Classification Search .................. 361/826, 361/679.55, 727, 752, 803; 174/66
    See application file for complete search history.

(56) References Cited

U.S. PATENT DOCUMENTS

| | | | |
|---|---|---|---|
| 4,458,967 A * | 7/1984 | King et al. | 439/96 |
| 2002/0057360 A1* | 5/2002 | Abe et al. | 348/373 |
| 2007/0107926 A1* | 5/2007 | Nishijima et al. | 174/72 A |
| 2007/0293283 A1 | 12/2007 | Inubushi et al. | |

FOREIGN PATENT DOCUMENTS

| | | |
|---|---|---|
| EP | 1686768 A2 | 8/2006 |
| JP | 2005-109971 A | 4/2005 |
| JP | 2005101774 A | 4/2005 |

(Continued)

OTHER PUBLICATIONS

European Search Report issued Jan. 13, 2012 in European Patent Application No. 08849738.3.

(Continued)

*Primary Examiner* — Jeremy Norris
*Assistant Examiner* — Tremesha S Willis
(74) *Attorney, Agent, or Firm* — Sughrue Mion, PLLC

(57) ABSTRACT

An electronic apparatus wiring harness is provided that includes: a fixed-side casing and a moving-side casing, the moving-side casing being provided with a moving-side casing base which is rotatably journalled to the fixed-side casing, and a sliding portion which is provided so as to be slidable on a slide surface provided in the moving-side casing base. The circuit of the sliding portion and the circuit of the fixed-side casing are electrically connected together by an electric wire, which is a wiring harness having a flat cable portion having electric wire bodies arranged in parallel and formed in a tape shape having a jacket strip portion in which a number of the electric wire bodies are bundled; the flat cable portion is arranged in a bent manner so as to form a U shape on the slide surface of the moving-side casing base.

3 Claims, 16 Drawing Sheets

FOREIGN PATENT DOCUMENTS

| | | |
|---|---|---|
| JP | 2007-036515 A | 2/2007 |
| JP | 2007134139 A | 5/2007 |
| JP | 2007227047 A | 9/2007 |
| WO | 2006-030607 A1 | 3/2006 |
| WO | 2007-136040 A1 | 11/2007 |

OTHER PUBLICATIONS

Office Action issued by Japanese Patent Office in Japanese Application No. 2008-096233 dated Aug. 7, 2012.

* cited by examiner

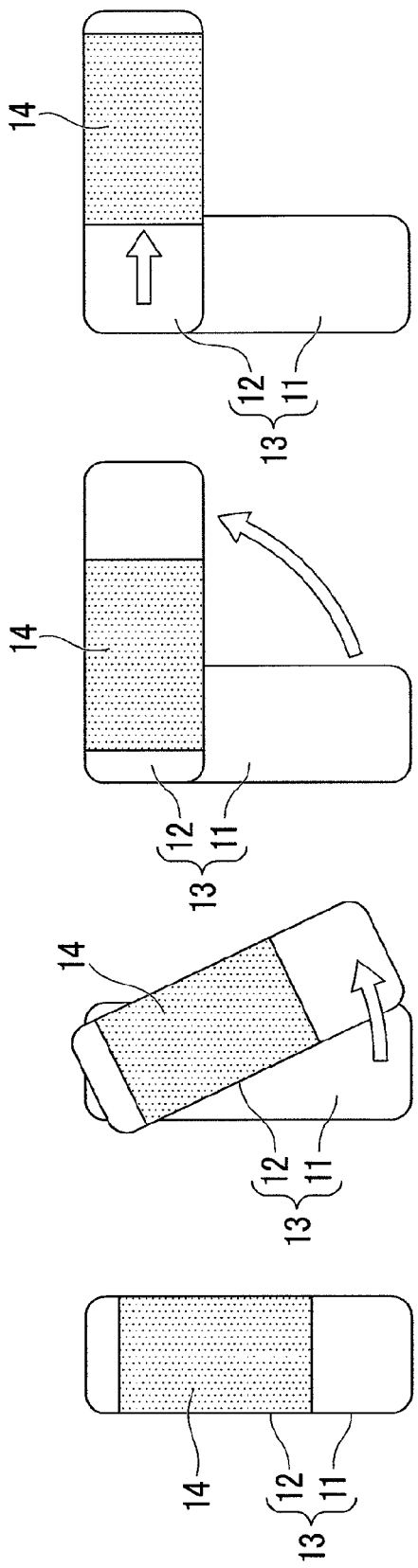

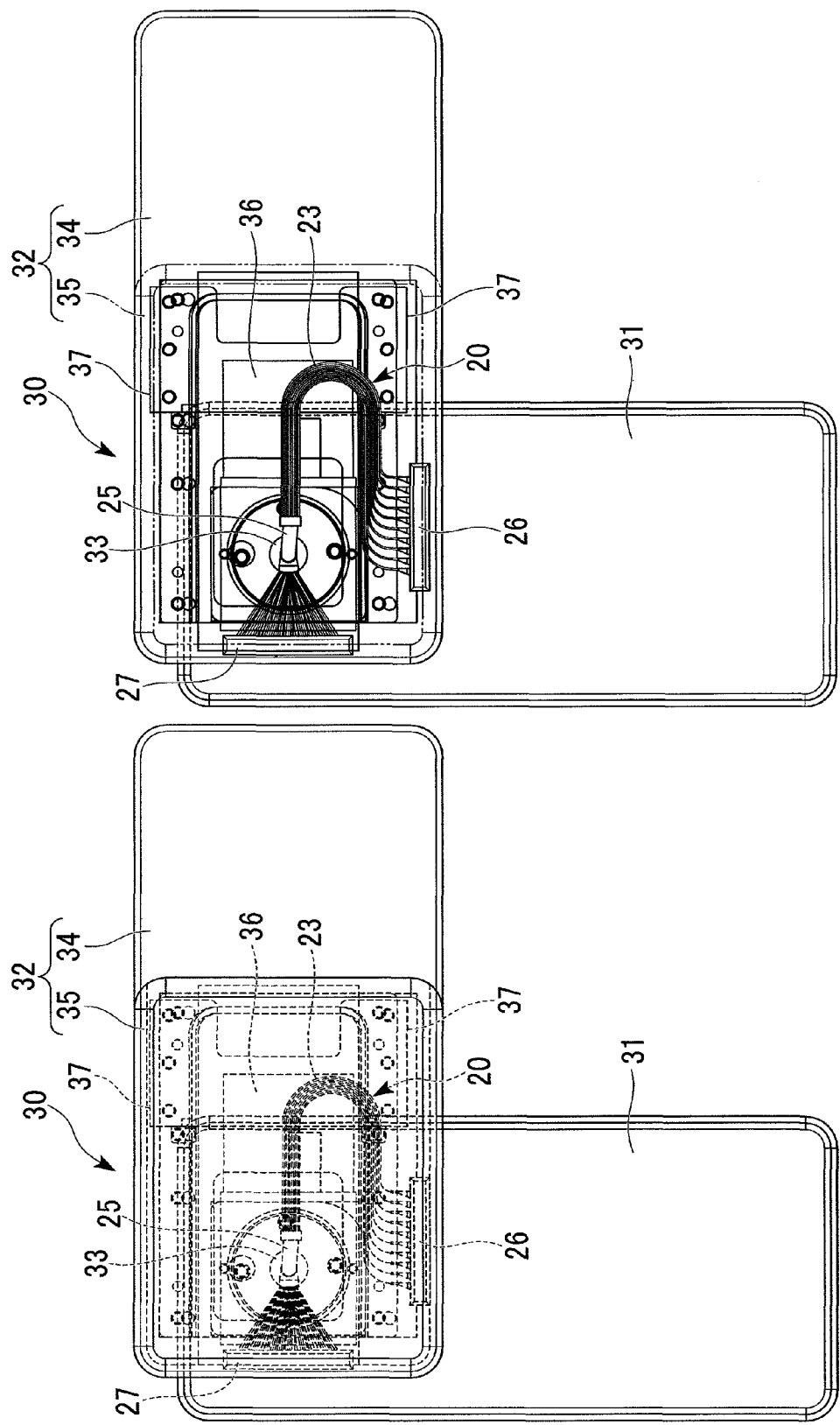

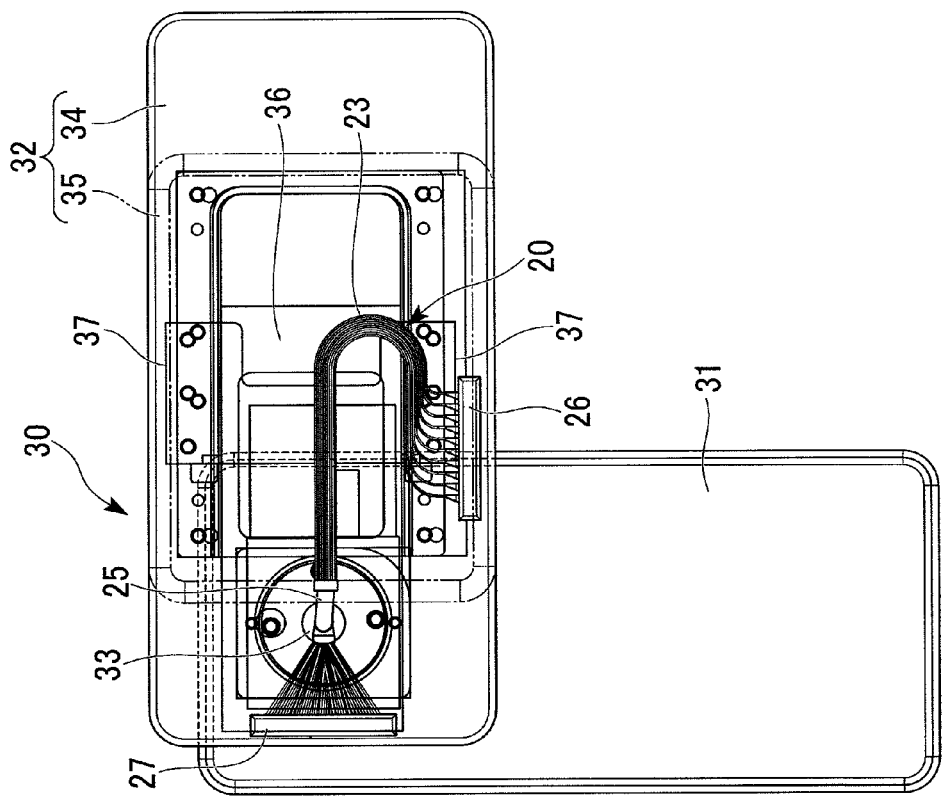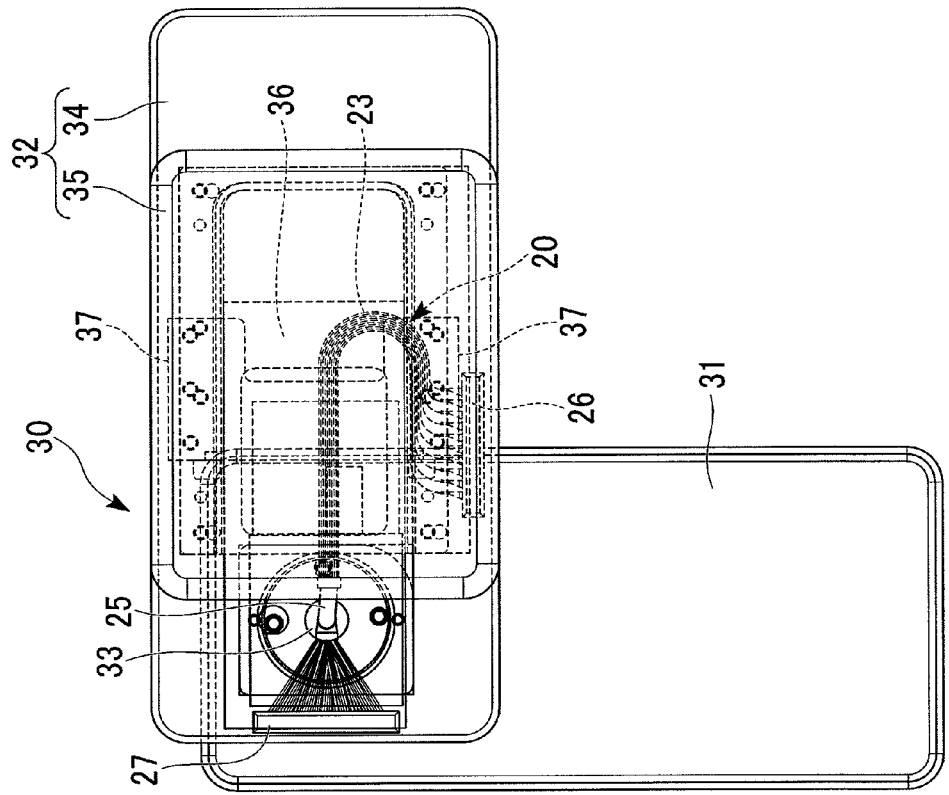

US 8,416,581 B2

ELECTRONIC APPARATUS AND ELECTRONIC APPARATUS WIRING HARNESS HAVING A FLAT U-SHAPE

CROSS REFERENCE TO RELATED APPLICATIONS

This application is a Continuation of International Application No. PCT/JP2008/070614, filed Nov. 12, 2008, which claims priority from Japanese Patent Application No. 2007-293195, filed Nov. 12, 2007, and Japanese Patent Application No. 2008-096233, filed Apr. 2, 2008, the disclosure of which is incorporated herein by reference in its entirety.

TECHNICAL FIELD

Aspects of the present invention relate to an electronic apparatus, such as a mobile telephone or a portable personal computer, which allows a sliding mechanism and a rotating mechanism to be used simultaneously, and a harness used for wiring between casings of this electronic apparatus.

BACKGROUND

In recent years, rapid progress has been made in the development of techniques to reduce the size and weight of mobile phones, which are only one representative example of electronic apparatuses to which the present invention may apply, to make them multifunctional. In place of flexible printed circuit boards (hereafter, referred to as "FPC"), there are increasing demands for micro coaxial cable assemblies as internal wiring material for mobile phones. This is because the transmission characteristics and noise resistance characteristics of micro coaxial cables better meet market demands.

Additionally, the structure of portable apparatuses has been complicated with recent development of portable TVs.

As shown in FIG. 1, in a sliding-type electronic apparatus 3 in which a sliding portion 2 is provided so as to be slidable with respect to the fixed-side casing 1, an FPC 4 shown in FIG. 2 is used as a wiring material.

Additionally, as shown in FIG. 3, in a rotational type electronic apparatus 6 in which the moving-side casing 5 is rotatably journalled to the fixed-side casing 1, a micro-coaxial cable 7 shown in FIG. 4 is used as a wiring material.

On the other hand, for example, a wiring material shown in FIG. 6A is conceivable as a wiring material for an electronic apparatus 13, as shown in FIGS. 5A to 5D, which can simultaneously use a sliding mechanism and a rotating mechanism of a type which rotates a moving-side casing 12 around a shaft with respect to a fixed-side casing 11 (refer to FIG. 5B) from a state (refer to FIG. 5A) where the fixed-side casing 11 and the moving-side casing 12 overlap each other, rotates the moving-side casing 12 to a position approximately orthogonal to the fixed-side casing 11 (refer to FIG. 5C), and slidingly moves a sliding portion 14 provided in the moving-side casing 12 (refer to FIG. 5D), thereby allowing a liquid crystal display of a sliding portion 14 to be easily viewed. This is a structure in which an FPC 15 corresponding to the movement of the sliding portion 14 and a number of micro-coaxial cables 16 corresponding to the movement of a rotating portion are connected together by soldering in a connecting portion 17. Additionally, an FPC connector 18 is formed at an end on the side of the FPC 15, and a micro-coaxial connector 19 is formed at an end on the side of the micro-coaxial cables 16. A wiring material shown in FIG. 6B shows a shape after forming of the wiring material of FIG. 6A, and a number of micro-coaxial cables are bundled by a binding protective tape 16a.

As another technique, a coaxial cable connecting structure in which two substrates which slide on each other are connected together using a plurality of coaxial cables, respective cores of which are shielded for signal transmission, is disclosed in, for example, Patent Document 1. In this coaxial cable connecting structure, the plurality of coaxial cables are bundled at both ends thereof so that the respective cables are arranged on a plane, and regions of middle portions of the coaxial cables which are not bundled are held between the substrates as an extra length.

[Patent Document 1] Japanese Unexamined Patent Application, First Publication No. 2007-36515

However, in the wiring material shown in FIGS. 6A and 6B, it is necessary to prepare the FPC 15 and the micro-coaxial cables 16 separately and perform the connection therebetween. This increases the time and cost of manufacturing. On the other hand, with the coaxial cable connecting structure disclosed in Patent Documents 1, the coaxial cables are bent in a height direction between substrates. Therefore, in order to secure the bending radius of the coaxial cables, a space in the height direction between substrates need be secured. For this reason, it is difficult to make a slide unit having a thin cross-section.

Additionally, the allowable curvature radius of a conventional FPC is about 1.0 mm to 1.5 mm, and a height required for the wiring material of the sliding portion is about 2.0 mm to 3.0 mm. Accordingly, the thickness of the electronic devices must be large enough to allow for these dimensions. However, making the portable apparatus thinner is desired in order to meet a recent demand for making a portable apparatus thin. It is difficult to meet the demand for making a portable apparatus thinner in using these related art wiring material using the FPC.

In view of the above circumstances, it is an aspect of the invention is to provide an electronic apparatus capable of further inexpensively providing a wiring material for an electronic apparatus which can simultaneously use a sliding mechanism and a rotating mechanism. Further, it is an aspect to permit the use of these mechanisms where the height of a sliding portion is 1.5 mm or less, and to provide an electronic apparatus wiring harness to be used as the wiring material of the electronic apparatus.

SUMMARY OF THE INVENTION

The exemplary non-limiting embodiments of the present invention may address at least the above problems and/or disadvantages and other disadvantages not described above. Also, these embodiments are not required to overcome the disadvantages described above, and an exemplary embodiment of the present invention may not overcome any of the problems described above.

(1) An electronic apparatus related to the invention includes a fixed-side casing and a moving-side casing each having a circuit and rotatably journalled by a shaft having a through hole at its center. The moving-side casing being provided with a moving-side casing base which is rotatably journalled to the fixed-side casing, and a sliding portion which is provided so as to be slidable on a slide surface provided in the moving-side casing base. The circuit of the sliding portion and the circuit of the fixed-side casing are electrically connected together by an electric wire. The electric wire is an electronic apparatus wiring harness having a flat cable portion in which a number of electric wire bodies are arranged in parallel and which is formed in a tape shape by jackets, and a jacket strip portion in which a number of the electric wire bodies are bundled. The flat cable portion is arranged in a bent manner so as to form a U shape on the slide surface of the moving-side casing base. The jacket strip portion is inserted through the through hole of the shaft, and extends from the slide surface toward the fixed-side casing.

(2) At least one of the electric wire bodies may be a micro-coaxial cable.

(3) The plurality of the flat cable portions may be stacked.

(4) An electronic apparatus wiring harness may be a wiring material which electrically connects the circuit of the sliding portion and the circuit of the fixed-side casing in the electronic apparatus of any one of (1) to (3) by the electric wire.

According to the electronic apparatus described in the above (1), it may be possible to further inexpensively provide a wiring material for an electronic apparatus which can simultaneously use a sliding mechanism and a rotating mechanism, and to cope with even a case where the height of the sliding portion is 1.5 mm or less.

According to the electronic apparatus wiring harness described in the above (4), it may be possible to further inexpensively provide an electronic apparatus wiring harness to be used as a wiring material for an electronic apparatus which can simultaneously use a sliding mechanism and a rotating mechanism, and to cope with even a case where the height of the sliding portion is 1.5 mm or less.

BRIEF DESCRIPTION OF THE DRAWINGS

FIG. 5A is a plan view illustrating the movement of an electronic apparatus related to an exemplary non-limiting embodiment which performs rotation and sliding.

FIG. 5B is a plan view illustrating the movement of the electronic apparatus related to the exemplary non-limiting embodiment which performs rotation and sliding.

FIG. 5C is a plan view illustrating the movement of the electronic apparatus related to the exemplary non-limiting embodiment which performs rotation and sliding.

FIG. 5D is a plan view illustrating the movement of the electronic apparatus related to the exemplary non-limiting embodiment which performs rotation and sliding.

FIG. 14 is a perspective view showing an example of the electronic apparatus, which is partially seen through.

FIG. 15A is a plan view showing a stored state where a fixed-side casing and a moving-side casing of the electronic apparatus overlap each other and showing a state where the inside of a sliding portion is seen through.

FIG. 16A is a plan view showing a state where the moving-side casing of the electronic apparatus has been slightly rotated, and showing a state where the inside of the sliding portion is seen through.

FIG. 17A is a plan view showing a state where the moving-side casing of the electronic apparatus has been rotated to a position approximately orthogonal to the fixed-side casing, and showing a state where the inside of the sliding portion is seen through.

FIG. 17B is a plan view showing a state where the moving-side casing of the electronic apparatus has been rotated to a position approximately orthogonal to the fixed-side casing, and showing a wiring state of the wiring harness in the electronic apparatus.

FIG. 18A is a plan view showing a state where the sliding portion has been slidingly moved after the moving-side casing of the electronic apparatus has been rotated to a position approximately orthogonal to the fixed-side casing, and showing a state where the inside of the sliding portion is seen through.

FIG. 18B is a plan view showing a state where the sliding portion has been slidingly moved after the moving-side casing of the electronic apparatus has been rotated to a position approximately orthogonal to the fixed-side casing, and showing a wiring state of the wiring harness in the electronic apparatus.

REFERENCE NUMERALS

20: ELECTRONIC APPARATUS WIRING HARNESS
21: MICRO-COAXIAL CABLE
22: FLAT CABLE
23: FLAT CABLE PORTION
24: JACKET
25: JACKET STRIP PORTION
26: FIRST CONNECTOR
27: SECOND CONNECTOR

28: BINDING MATERIAL
30: ELECTRONIC APPARATUS
31: FIXED-SIDE CASING
32: MOVING-SIDE CASING
33: SHAFT
34: MOVING-SIDE CASING BASE
35: SLIDING PORTION
36: SLIDE SURFACE
37: SLIDING HINGE

DETAILED DESCRIPTION OF THE
EXEMPLARY NON-LIMITING EMBODIMENTS

Hereinafter, exemplary non-limiting embodiments of the invention will be described with reference to the accompanying drawings.

Figure 7:
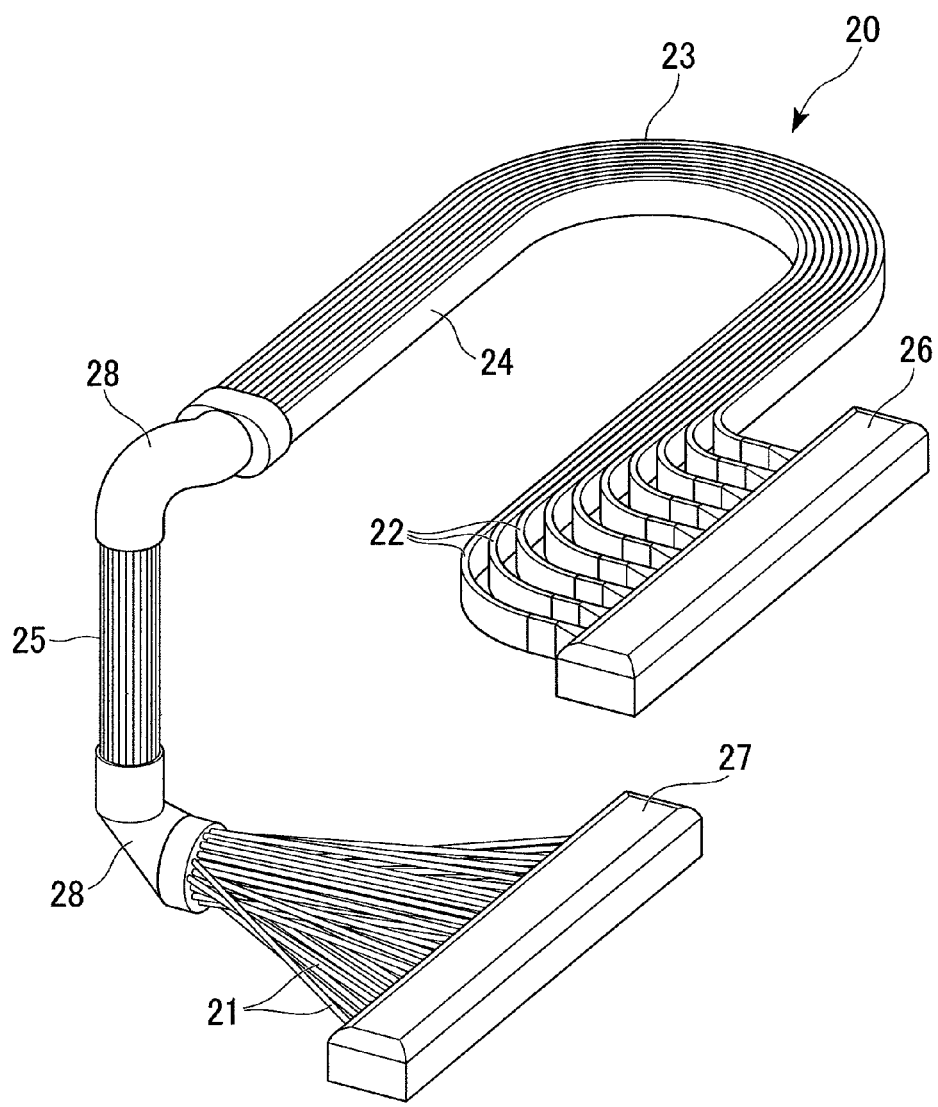
FIG. 7 is a plan view showing one embodiment of an electronic apparatus wiring harness.

FIG. 7 is a schematic plan view showing one embodiment of an electronic apparatus wiring harness of the invention. An electronic apparatus wiring harness 20 of this non-limiting embodiment is provided with: a flat cable portion 23 in which a plurality of flat cables 22, in each of which a number of micro-coaxial cables 21 are arranged in parallel and which is formed in a tape shape by a jacket 24, overlap each other; a jacket strip portion 25 in which a number of the micro-coaxial cables 21 are bundled by a binding material 28; a first connector 26 provided at the end of the harness on the side of the flat cable portion 23; and a second connector 27 provided at the end of the harness on the side of the jacket strip portion 25.

Figure 8:
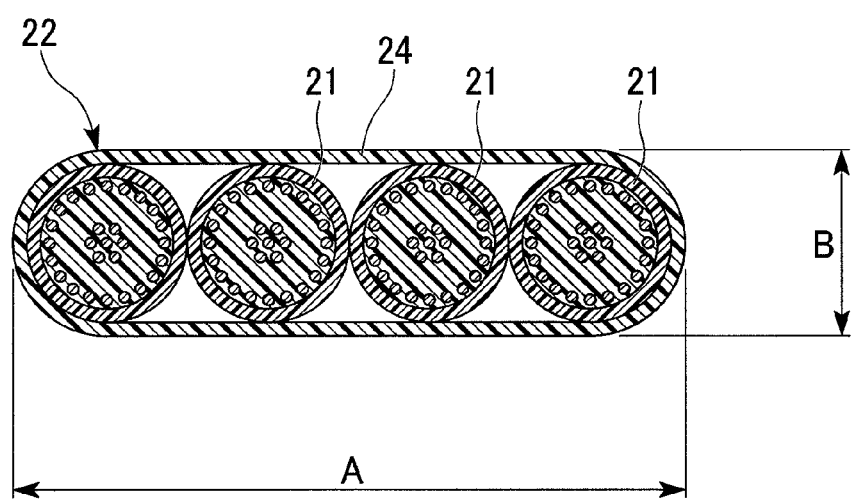
FIG. 8 is a cross-sectional view showing an example of a flat cable used for the electronic apparatus wiring harness.

In this non-limiting embodiment, the electronic apparatus wiring harness 20, as shown in FIG. 8, is provided with: a flat cable 22 in which a number of micro-coaxial cables 21 (four in an example of FIG. 8), each of which is composed of a central conductor, an inside insulating layer surrounding the central conductor, an outer conductor surrounding the inside insulating layer, and an outside coating surrounding the outer conductor, are arranged in parallel, and which is formed in a tape shape by a jacket 24 made of ultraviolet curable resin, fluororesin, etc.; and a jacket strip portion 25 in which the jacket 24 is removed and the micro-coaxial cables 21 are exposed. In this non-limiting embodiment, the micro-coaxial cables 21 are used as main bodies of electric wires. However, the invention is not limited to this example. For example, the electronic apparatus wiring harness 20 may be configured by combinations of electric wires, such as electric wires for power supply, which are not coaxial cables, and the micro-coaxial cables 21. Additionally, the type of the micro-coaxial cables 21 to be used, the combination of the winding direction of the outer conductor, etc. are not so limited. Although the width A and thickness B of the four-core flat cable illustrated in FIG. 8 are not particularly limited, for example, they can be set to be the width A=1.23 mm or so, and the thickness B=0.36 mm or so.

Figure 9A:
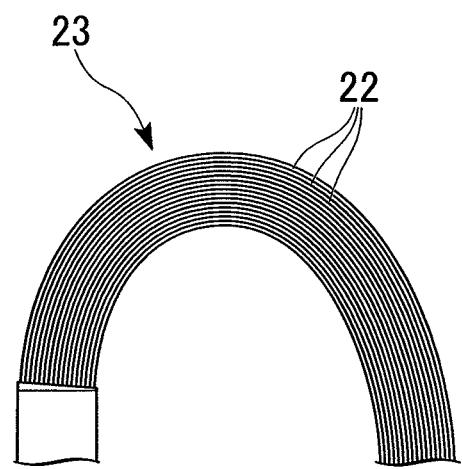
FIG. 9A is a view showing a flat cable portion of the electronic apparatus wiring harness of the invention.
Figure 9B:
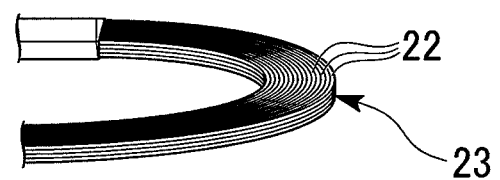
FIG. 9B is a view showing the flat cable portion of the electronic apparatus wiring harness.
Figure 10A:
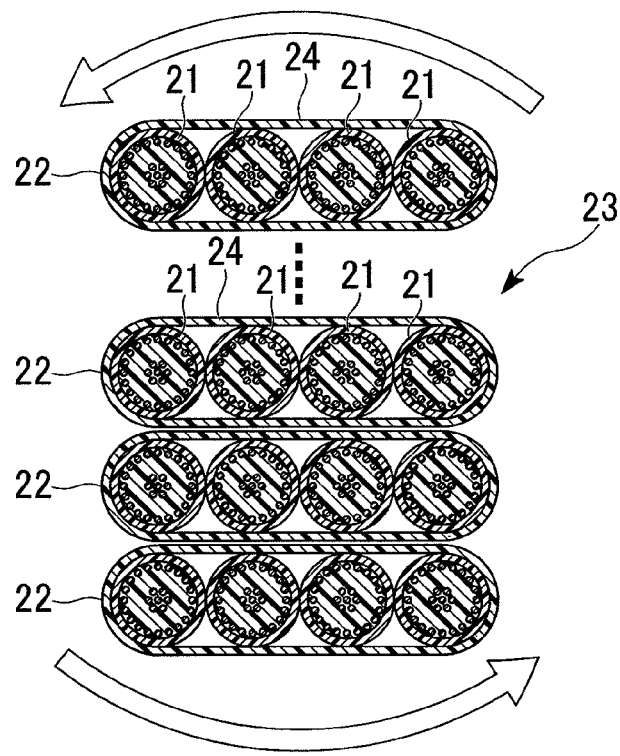
FIG. 10A is a view illustrating a twisted state of the flat cable portion and a jacket strip portion of the electronic apparatus wiring harness.
Figure 14:
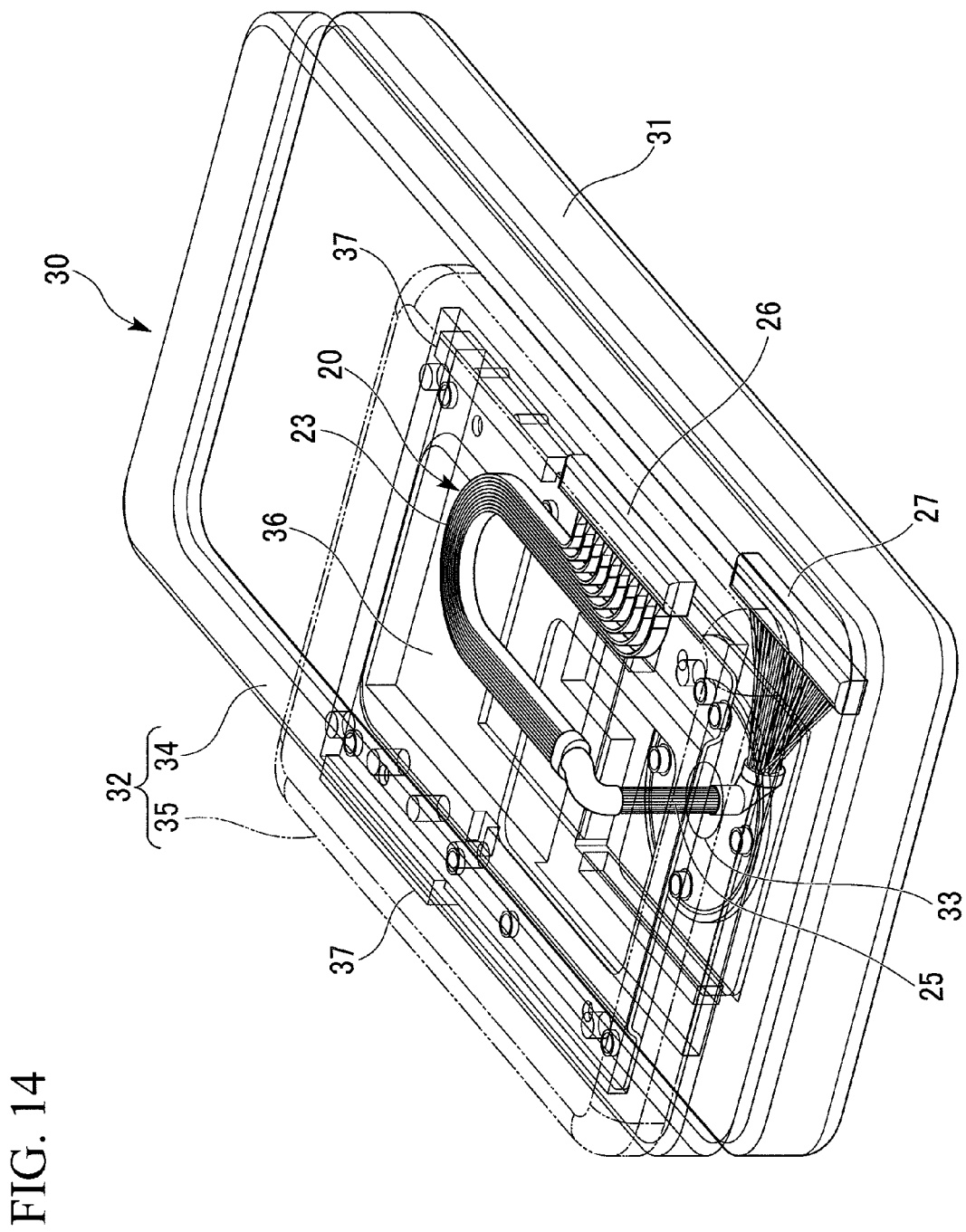

In this non-limiting embodiment, the flat cable portion 23 of the electronic apparatus wiring harness 20, as shown in FIGS. 9A and 9B, has a structure in which a plurality of flat cables 22 as mentioned above overlap each other, and is bundled by a tape, etc. if necessary. When the flat cable portion 23, as shown in FIG. 10A, is applied to a rotating portion of a rotatable and slidable electronic apparatus, the flat cable portion is apt to receive stress by twisting compared with a bundle (refer to FIG. 10B) of typical micro-coaxial cables. Accordingly, in this non-limiting embodiment, the flat cable portion 23 is arranged in a position corresponding to a slide surface 36 in a rotatable and slidable electronic apparatus 30 as shown in FIG. 14. On the other hand, the jacket strip portion 25 composed of a bundle of a number of micro-coaxial cables 21 which are exposed as the jacket 24 is removed, is arranged so as to be inserted through a through hole of a shaft 33, which rotatably journals a fixed-side casing 31 and a moving-side casing 32, and has the through hole at its center, in order to correspond to the rotating portion.

Figure 1:
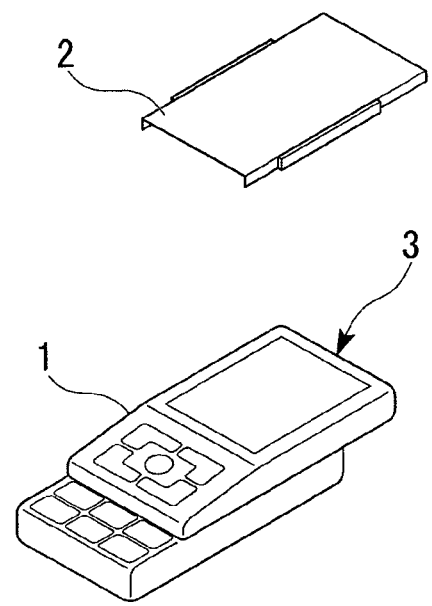
FIG. 1 is a perspective view illustrating a sliding-type electronic apparatus.
Figure 2:
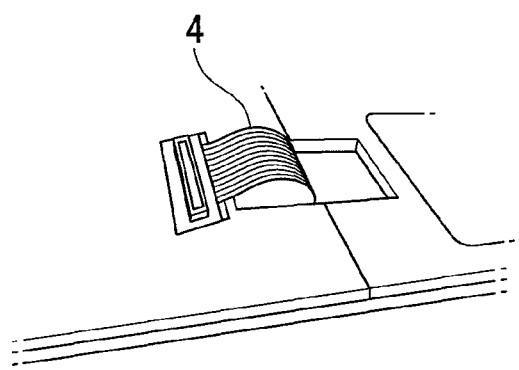
FIG. 2 is a perspective view illustrating an FPC to be used for the sliding-type electronic apparatus.
Figure 3:
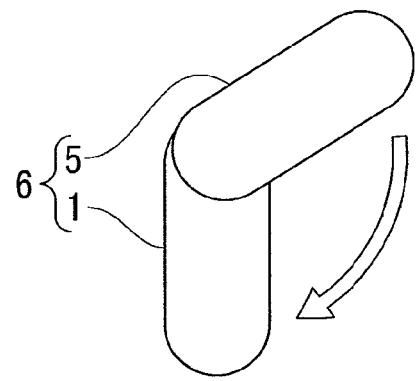
FIG. 3 is a plan view illustrating the movement of a rotational structure type electronic apparatus.
Figure 4:
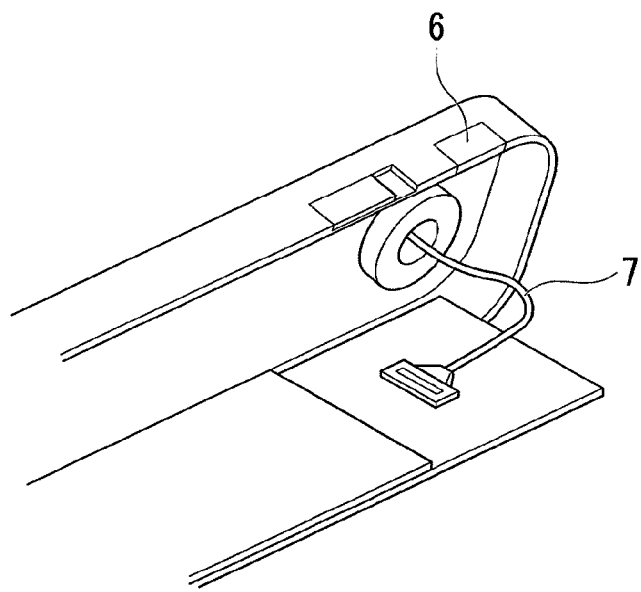
FIG. 4 is a perspective view illustrating a wiring material to be used for the rotational-type electronic apparatus.
Figure 6A:
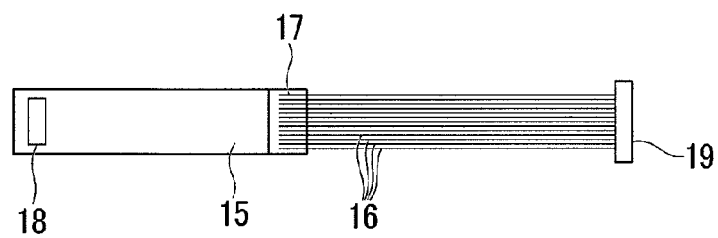
FIG. 6A is a view illustrating a wiring material used for an electronic apparatus which performs rotation and sliding.
Figure 6B:
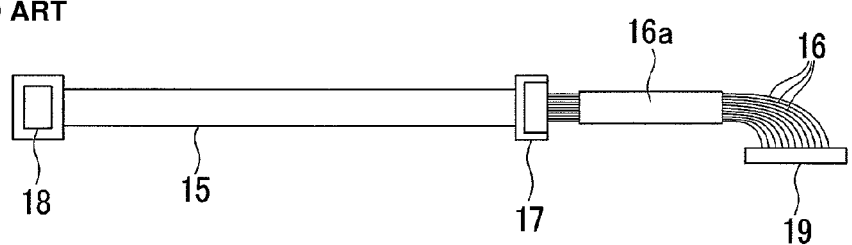
FIG. 6B is a view illustrating the wiring material used for the electronic apparatus which performs rotation and sliding.
Figure 11:
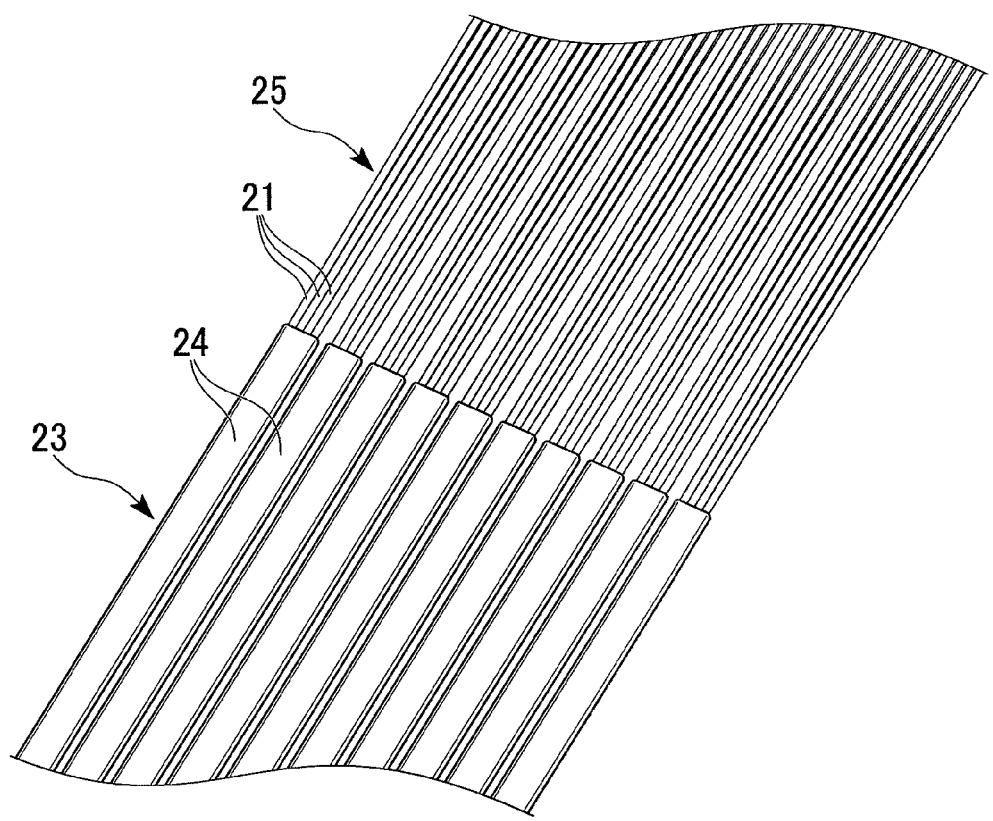
FIG. 11 is a perspective view showing the circumference of the jacket strip portion of the electronic apparatus wiring harness according to an exemplary non-limiting embodiment of the invention.
Figure 12A:
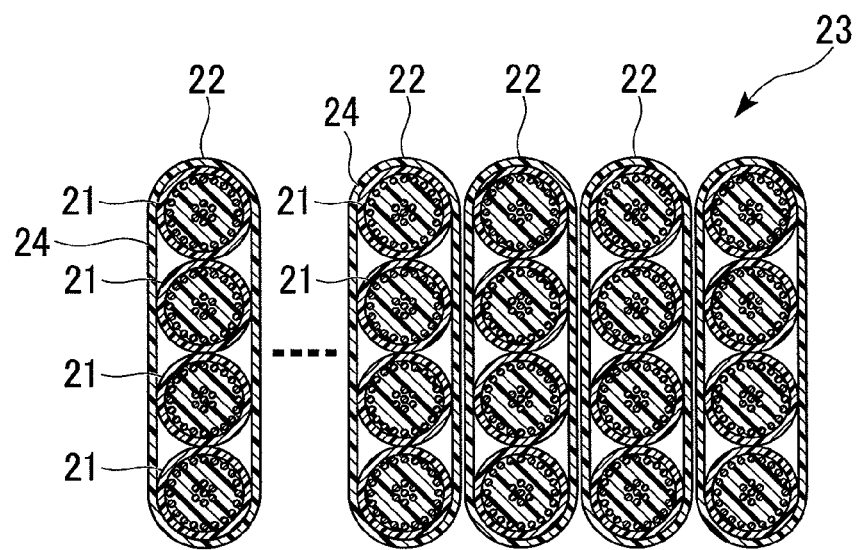
FIG. 12A is a view showing a detailed structure of the flat cable portion and the jacket strip portion of the electronic apparatus wiring.
Figure 12B:
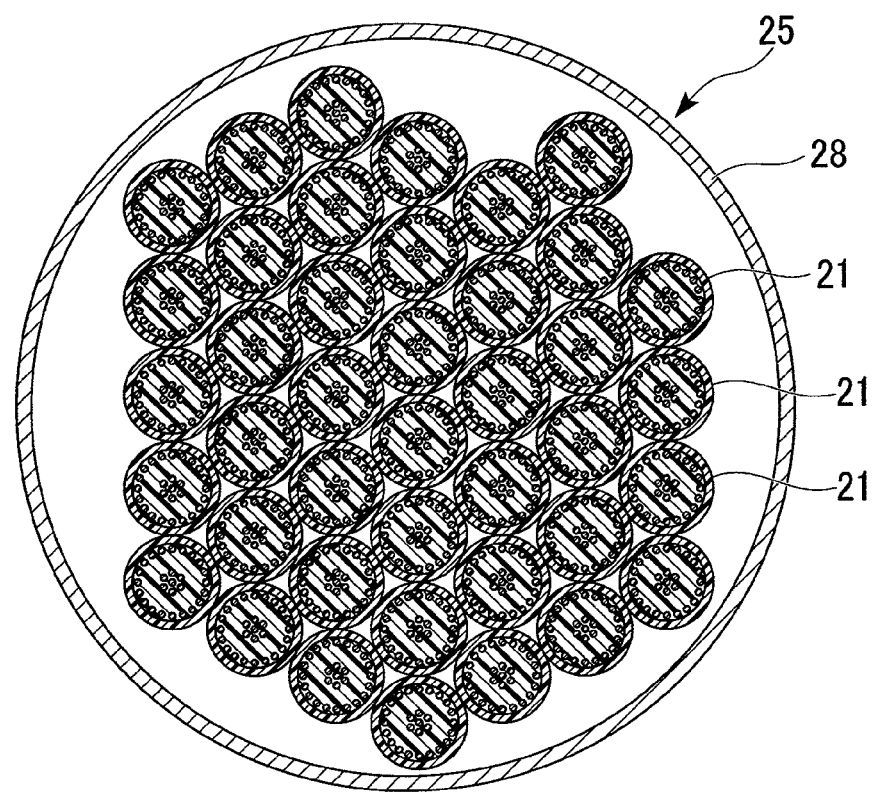
FIG. 12B is a view showing the detailed structure of the flat cable portion and the jacket strip portion of the electronic apparatus wiring.
Figure 13A:
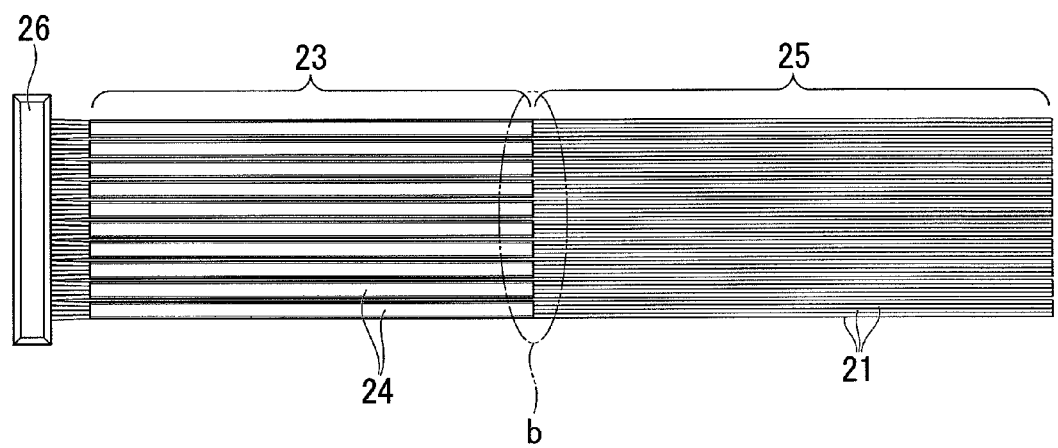
FIG. 13A is a view showing a detailed structure of the flat cable portion and the jacket strip portion of the electronic apparatus wiring.
Figure 13B:
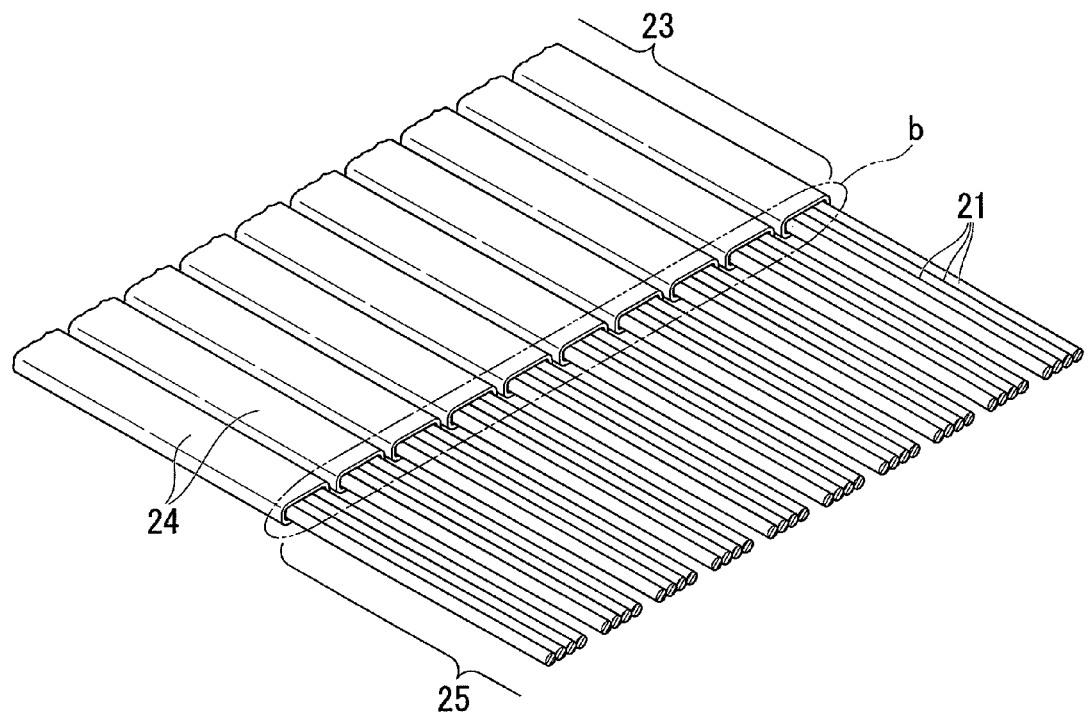
FIG. 13B is a view showing the detailed structure of the flat cable portion and the jacket strip portion of the electronic apparatus wiring.

FIG. 11 is a perspective view showing the circumference of the jacket strip portion 25 of the electronic apparatus wiring harness 20 of this embodiment. The jacket strip portion 25 has a structure in which the jackets 24 on one side are all removed from a predetermined position of the flat cable portion 23 altogether, the micro-coaxial cables 21 are exposed, and both ends of the coaxial cables are bundled by the binding material 28. In this non-limiting embodiment, the jacket strip portion 25 for being applied to the rotating portion of the rotatable and slidable electronic apparatus has a structure in which the jackets 24 of the flat cable portion 23 are removed. Thereby, a more simple and inexpensive manufacture may be made compared with a harness structure in which the FPC 15 and the micro-coaxial cables 16 are connected together by soldering as shown in FIGS. 6A and 6B.

FIGS. 12A and 12B and FIGS. 13A and 13B are views showing the structure of the flat cable portion 23 and the jacket strip portion 25 of the electronic apparatus wiring harness 20 of this non-limiting embodiment. Here, a boundary b between the flat cable portion 23 and the jacket strip portion 25 is formed in a straight line along the width direction of the flat cable portion 23. Although a method of removing the jackets 24 after completion of the flat cable portion 23 may be used as the method of removing the jackets 24 locally, there is a method of providing a portion which is not coated with a material for a jacket 24 in a portion of a flat cable 22 during manufacture of this flat cable, a method of not performing UV irradiation locally when ultraviolet curable resin is used for the jacket 24, or the like. In this case, the flat cable may be manufactured by aligning the positions of respective boundaries and binding a plurality of coaxial cables together.

The electronic apparatus wiring harness 20, as shown in FIG. 14, can be applied as a wiring material of the electronic apparatus 30 which is configured such that the fixed-side casing 31 and the moving-side casing 32 each having a circuit (not shown) are journalled rotatably, a sliding portion 35 provided in the moving-side casing 32 is provided so as to be slidable on a slide surface 36 of a moving-side casing base 34, and the circuits built in the sliding portion 35 and the fixed-side casing 31, respectively, are connected electrically with electric wires. Thereby, the electronic apparatus 30 can be made thin compared with the case where the wiring material of the conventional technique is applied.

FIG. 14 is a perspective view showing an example of the electronic apparatus 30 related to the invention, a portion of which is seen through.

In the electronic apparatus 30 of this example, the fixed-side casing 31 and the moving-side casing 32 each having a circuit (not shown) are rotatably journalled by the shaft 33 having a through hole at it center. The moving-side casing 32 includes the moving-side casing base 34 rotatably journalled to the fixed-side casing 31, and the sliding portion 35 slidably provided on the slide surface 36 provided in the moving-side casing base 34. The circuits of the sliding portion 35 and the fixed-side casing 31 are electrically connected together by the electronic apparatus wiring harness 20 shown in FIG. 7. The electronic apparatus 30 is configured such that the moving-side casing 32 is rotatable about the shaft 33 with respect to the fixed-side casing 31, and the sliding portion 35 of the moving-side casing 32 is slidable on the slide surface 36 of the moving-side casing base 34.

In the electronic apparatus 30, the flat cable portion 23 of the electronic apparatus wiring harness 20 is arranged in a bent manner so as to form a U shape on the slide surface 36 of the moving-side casing base 34. Additionally, the jacket strip portion 25 of the electronic apparatus wiring harness 20 is inserted through the through hole of the shaft 33, and extends toward the fixed-side casing 31 from the slide surface 36. The first connector 26 at a terminal of the electronic apparatus wiring harness 20 on the side of the flat cable portion 23 is connected to a connecting portion of the circuit (not shown) in the sliding portion 35. Additionally, the second connector 27 at a terminal of the wiring harness on the side of the jacket strip portion 25 which extends toward the fixed-side casing 31 through the through hole of the shaft 33 is connected to a connecting portion of the circuit (not shown) in the fixed-side casing 31.

In the electronic apparatus 30, the jacket strip portion 25 of the electronic apparatus wiring harness 20 is in a state where both ends thereof except a longitudinal middle portion thereof are bound by the binding material 28, respectively, and the micro-coaxial cables 21 are exposed without providing the binding material 28 in the middle portion. Also, the middle portion where the binding material 28 is not provided is arranged so as to be inserted through the through hole of the shaft 33. Thereby, the middle portion of the jacket strip portion 25 located within the through hole of the shaft 33 is relatively easily twisted in various ways with the rotation of the shaft 33 (refer to FIG. 10B), and the rotational movement between the fixed-side casing 31 and the moving-side casing 32 about the shaft 33 can be performed smoothly. If the binding material 28 is in the middle portion inserted through the through hole of the shaft 33, there is a possibility that friction may be caused between the binding material 28 and the bundle of the micro-coaxial cables 21, and between the bound micro-coaxial cables 21 during the rotation, and problems, such as disconnection, may be caused during repeated use.

In the electronic apparatus 30, the flat cable portion 23 of the electronic apparatus wiring harness 20 is arranged on the slide surface 36 of the moving-side casing base 34 in state where a plurality of flat cables 22 in which a number of micro-coaxial cables 21 are arranged in parallel, and which is formed in a tape shape by the jackets 24 are stacked, and these flat cables 22 are bent in a U shape. Thereby, when the sliding portion 35 slides along the longitudinal direction of the moving-side casing base 34, the flat cable portion 23 is gently deflected on the slide surface 36, so that the electronic apparatus wiring harness 20 can follow the sliding movement. In the flat cable portion 23, a number of micro-coaxial cables 21 are covered with the jackets 24. Thus, if the flat cable portion 23 is made to follow the rotation of the shaft 33 like the jacket strip portion 25, there is a concern in that the micro-coaxial cables 21 may be damaged due to the friction between the jackets 24 and the micro-coaxial cables 21. However, when the flat cable portion 23 is made to follow the sliding movement in a state where it is bent in a U shape, the flat cable portion 23 has such a degree of movement that is gently deflected on the slide surface 36. Therefore, the harness of the invention can be applied satisfactorily. Additionally, the flat cable portion is arranged on the slide surface 36 of the moving-side casing base 34 in state where a plurality of flat cables 22 are stacked, and these flat cables are bent in a U shape. Thereby, the harness of the invention can cope with even a case where the height of the sliding portion is 1.5 mm or less, and is very effective in making the electronic apparatus 33 thin.

In the electronic apparatus 30, the sliding portion 35 is configured so as to slidably sandwich a bottom portion of the plate-like sliding portion 35 along with the sliding hinge 37 provided on the side of the moving-side casing base 34. Guide grooves where touches both side edges of the bottom portion of the plate-like sliding portion 35 are arranged in the sliding hinge 37 according to this illustration, both side edges of the bottom portion of the sliding portion 35 is sandwiched between the pair of guide grooves of the sliding hinge 37, and the sliding portion 35 is slidably held in the longitudinal direction of the moving-side casing base 34. A projection (stopper) for regulating the range of this sliding is provided on the bottom portion of the sliding portion 35. The sliding mechanism of the sliding portion 35 is not limited to this illustration, and other conventionally well-known sliding mechanisms can also be applied.

FIG. 15A to FIG. 18B are views showing the relationship between the rotation and sliding movement of the moving-side casing 32 of the electronic apparatus 30, and the movement of the electronic apparatus wiring harness 20.

Figure 15A:
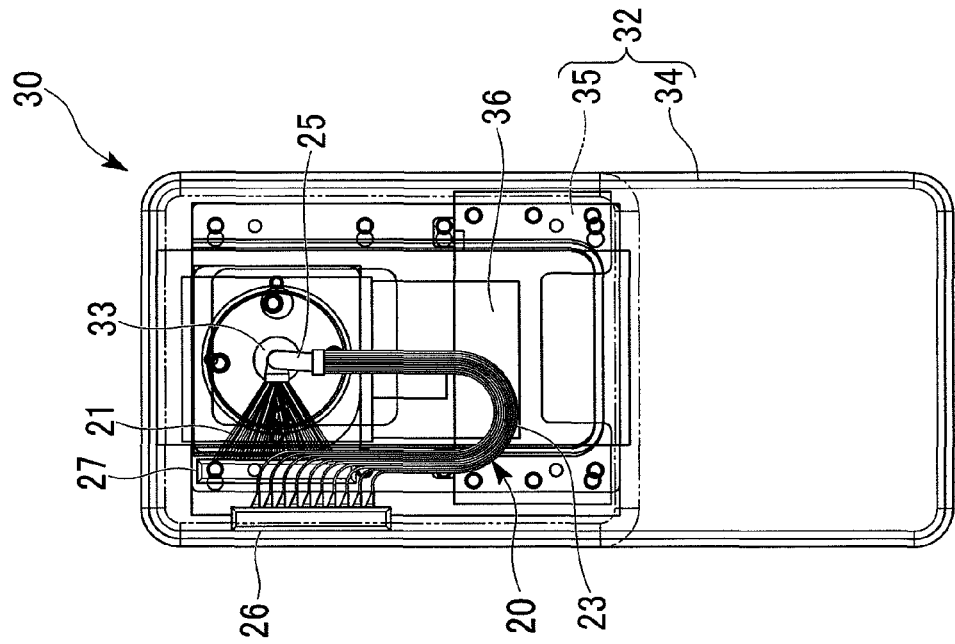
Figure 15B:
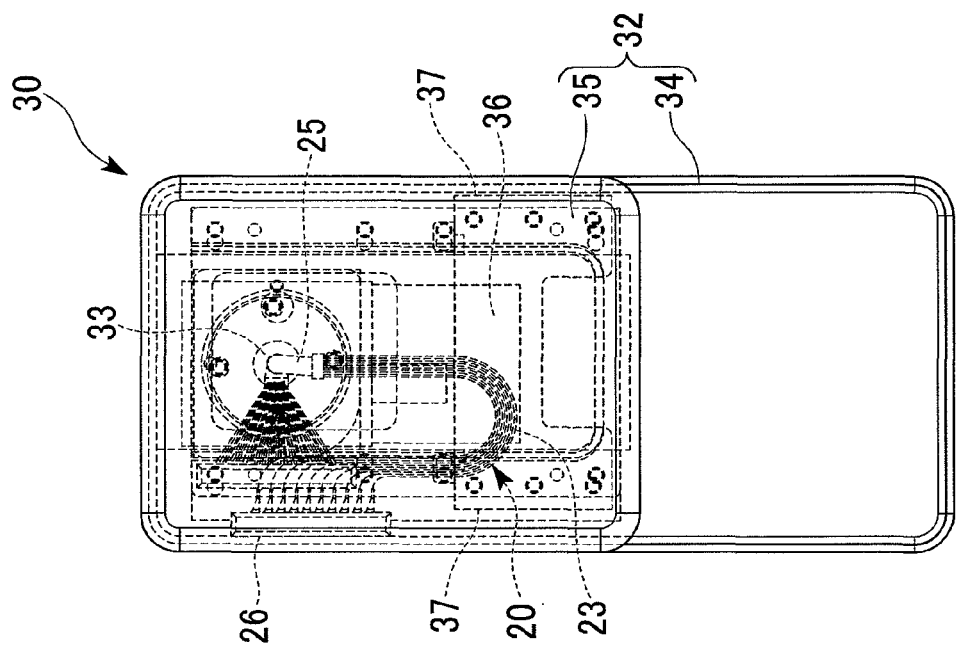
FIG. 15B is a plan view showing the stored state where the fixed-side casing and the moving-side casing of the electronic apparatus overlap each other and showing a wiring state of the wiring harness within the electronic apparatus.

FIGS. 15A and 15B show the stored state (closed state) where the fixed-side casing 31 and the moving-side casing 32 of the electronic apparatus 30 overlap each other, and specifically, FIG. 15A is a plan view when the inside of the sliding portion 35 is seen through, and FIG. 15B is a plan view showing a wiring state of the wiring harness 20 within the electronic apparatus 30.

Figure 16A:
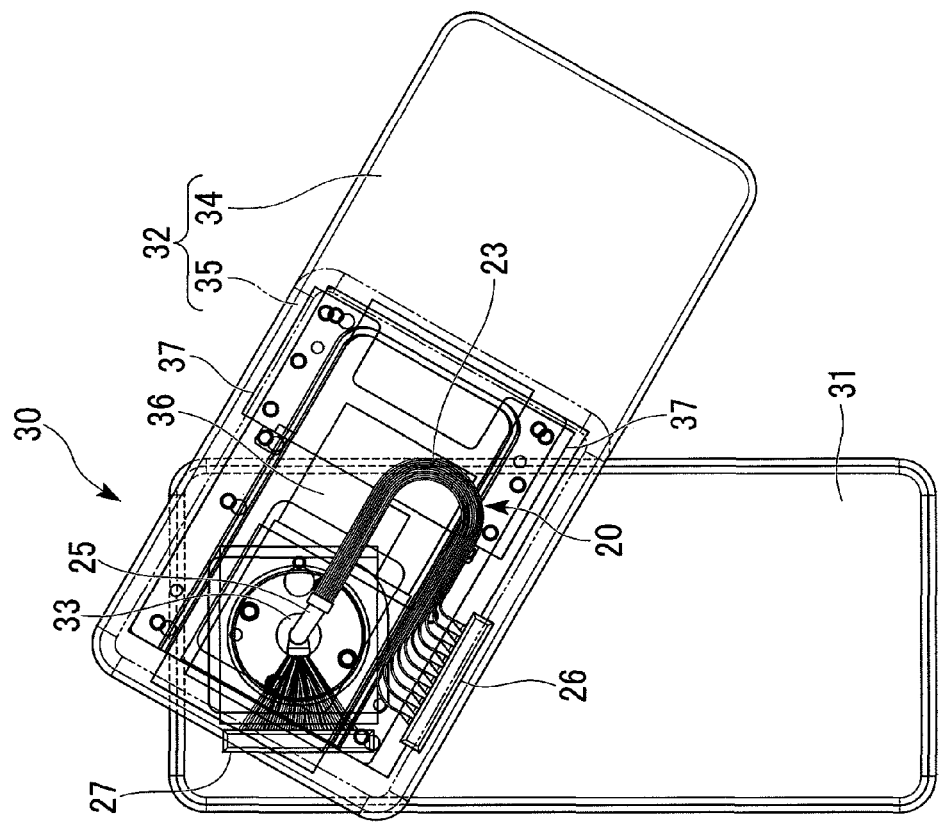
Figure 16B:
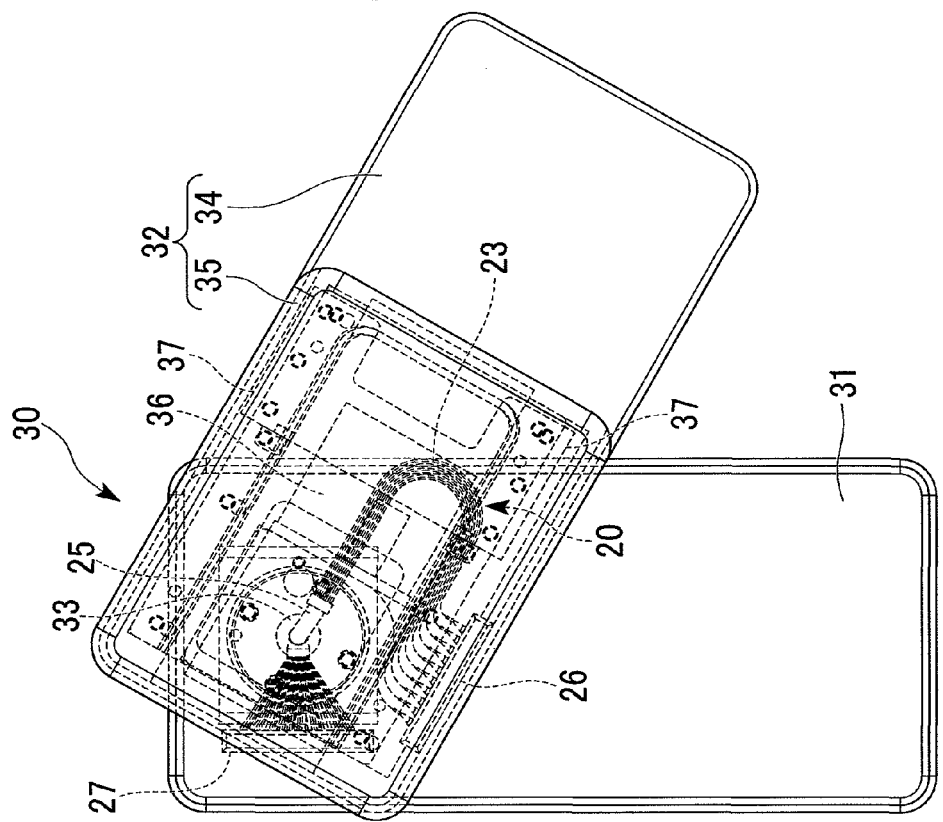
FIG. 16B is a plan view showing a state where the moving-side casing of the electronic apparatus has been slightly rotated, and showing a wiring state of the wiring harness in the electronic apparatus.

FIGS. 16A and 16B show a state where the moving-side casing 32 of the electronic apparatus 30 has been rotated slightly, and specifically, FIG. 16A is a plan view when the inside of the sliding portion 35 is seen through, and FIG. 16B is a plan view showing a wiring state of the wiring harness 20 within the electronic apparatus 30.

FIGS. 17A and 17B show a state where the moving-side casing 32 of the electronic apparatus 30 has been rotated to a position approximately orthogonal to the fixed-side casing 31, and specifically, FIG. 17A is a plan view when the inside of the sliding portion 35 is seen through, and FIG. 17B is a plan view showing a wiring state of the wiring harness 20 within the electronic apparatus 30.

FIGS. 18A and 18B show a state where the sliding portion 35 has been slidingly moved along the longitudinal direction of the fixed-side casing 34 after the moving-side casing 32 of the electronic apparatus 30 has been rotated to a position approximately orthogonal to the fixed-side casing 31, and specifically, FIG. 18A is a plan view when the inside of the sliding portion 35 is seen through, and FIG. 18B is a plan view showing a wiring state of the wiring harness 20 within the electronic apparatus 30.

In the stored state shown in FIGS. 15A and 15B, the flat cable portion 23 of the electronic apparatus wiring harness 20 is arranged in a bent manner so as to form a U shape on the slide surface 36 of the moving-side casing base 34, and the jacket strip portion 25 is inserted through the through hole of the shaft 33, and extends toward the fixed-side casing 31 from the slide surface 36. The first connector 26 at the terminal of the wiring harness on the side of the flat cable portion 23 is connected to a connecting portion of the circuit (not shown) in the sliding portion 35. The second connector 27 at the terminal of the wiring harness on the side of the jacket strip portion 25 which extends toward the fixed-side casing 31 through the through hole of the shaft 33 is connected to a connecting portion of the circuit (not shown) in the fixed-side casing 31. As such, the circuit within the fixed-side casing 31 and the circuit within the sliding portion 35 are electrically connected together by the electronic apparatus wiring harness 20.

Figure 10B:
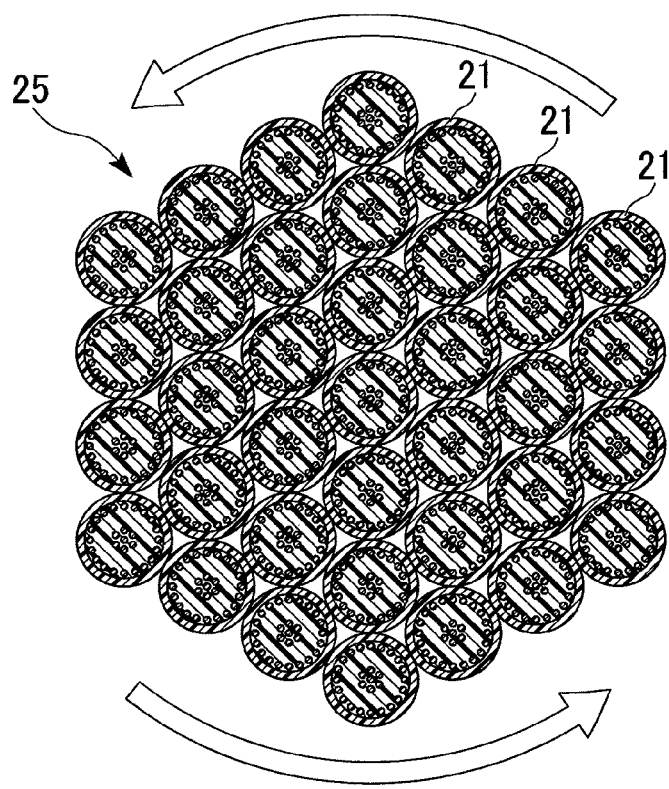
FIG. 10B is a view illustrating a twisted state of a micro-coaxial cable assembly.

FIGS. 16A and 16B show a state where the moving-side casing 32 has been slightly rotated from the stored state. When the moving-side casing 32 is rotated about the shaft 33 with respect to the fixed-side casing 31, the middle portion of the jacket strip portion 25 of the electronic apparatus wiring harness 20 is twisted so as to follow the rotation. As mentioned above, the middle portion of the jacket strip portion 25 are in a state where the micro-coaxial cables 21 are free as shown in FIG. 10B, without being covered with the jackets 24 or the binding material 28. Therefore, creation of friction is little between the micro-coaxial cables 21 and the binding material 28 and between the micro-coaxial cables 21, and the middle portion is twisted so as to follow the rotation smoothly. At this time, the flat cable portion 23 scarcely moves.

FIGS. 17A and 17B show a state where the moving-side casing 32 has been rotated to a position approximately orthogonal to the fixed-side casing 31. The range of the rotation angle of the moving-side casing 32 is not particularly limited. Generally, in order to regulate the rotation to a desired angle, a projection or groove (stopper) for stopping rotation is provided in a proper position of one or both of the moving-side casing 32 and the fixed-side casing 31 to regulate the range of rotation angle. With the moving-side casing 32 opened (rotated), the middle portion of the jacket strip portion 25 of the electronic apparatus wiring harness 20 is twisted so as to follow the rotation, and the flat cable portion 23 barely moves.

FIGS. 18A and 18B show a state where the sliding portion 35 has been made to slide along the longitudinal direction of the moving-side casing base 34 after the moving-side casing 32 has been rotated to a position approximately orthogonal to the fixed-side casing 31 as shown in FIGS. 17A and 17B. When the sliding portion 35 is made to slide, the flat cable portion 23 is gently deflected on the slide surface 36, so that the wiring harness can follow the sliding movement. In the sliding movement of this sliding portion 35, the flat cable portion 23 which is bent in a U shape has such a degree of movement that is gently deflected on the slide surface 36. Therefore, the harness of the invention can be applied satisfactorily even in a state where a plurality of flat cables 22 are stacked and are bent in a shape U shape.

When the sliding portion 35 and the moving-side casing 32 are returned to the stored state shown in FIGS. 15A and 15B from the state shown in FIGS. 18A and 18B, the flat cable portion 23 of the electronic apparatus wiring harness 20 is gently deflected on the slide surface 36, and is returned in the U shape as shown in the flat cable portion 23 shown in FIG. 15A to FIG. 17B. Additionally, the middle portion of the jacket strip portion 25 in a twisted state returns to its original state which is not twisted, according to the rotation to the storing direction of the moving-side casing 32.

As described above, according to non-limiting exemplary embodiments of the invention, the electronic apparatus wiring harness 20 of the electronic apparatus 30 can simultaneously use a sliding mechanism and a rotating mechanism and be provided inexpensively to thereby reduce the cost of the electronic apparatus 30. Additionally, by using the electronic apparatus wiring harness 20, it is possible to cope with the case where the height of the sliding portion 35 is 1.5 mm or less, and the electronic apparatus 30 can be made thinner.

INDUSTRIAL APPLICABILITY

The electronic apparatus wiring harness of the non-limiting exemplary embodiments of the invention include a fixed-side casing and a moving-side casing each having circuit and rotatably journalled by a shaft having a through hole at its center, the moving-side casing being provided with a moving-side casing base which is rotatably journalled to the fixed-side casing, and a sliding portion provided so as to be slidable on a slide surface provided in the moving-side casing base. The circuit of the sliding portion and the circuit of the fixed-side casing are electrically connected together by an electric wire. The electric wire is an electronic apparatus wiring harness having a flat cable portion in which a number of electric wire bodies are arranged in parallel and which is formed in a tape shape by jackets, and a jacket strip portion in which a number of the electric wire bodies are bundled. The flat cable portion is arranged in a bent manner so as to form a U shape on the slide surface of the moving-side casing base. The jacket strip portion is inserted through the through hole of the shaft, and extends toward the fixed-side casing from the slide surface.

What is claimed is:

1. An electronic apparatus comprising:
   a fixed-side casing;
   a moving-side casing having a moving-side casing base rotatably connected to the fixed-side casing by a shaft having a through hole at its center, and a sliding portion which is provided so as to be slidable on a slide surface provided in the moving-side casing base,
   wherein a circuit of the sliding portion and a circuit of the fixed-side casing are electrically connected together by an electric wire;
   wherein the electric wire is an electronic apparatus wiring harness having a flat cable portion in which a number of electric wire bodies are arranged in parallel and which is formed in a tape shape by jackets, the wiring harness including a jacketless portion in which a number of the electric wire bodies are bundled;
   the flat cable portion is arranged in a bent manner so as to form a flat U shape on the slide surface of the moving-side casing base and such that a thickness direction of the tape shape is parallel to the slide surface; and
   a jacket strip portion is inserted through the through hole of the shaft, and extends from the slide surface toward the fixed-side casing.

2. The electronic apparatus according to claim 1, wherein at least one of the electric wire bodies is a micro-coaxial cable.

3. The electronic apparatus according to claim 1, wherein a plurality of the flat cable portions is stacked.

* * * * *